March 2, 1954
J. S. TRUESDELL
2,670,937
APPARATUS FOR PRODUCING FONDANT
MATERIAL FOR CANDY MANUFACTURE
Filed Jan. 24, 1951
2 Sheets-Sheet 1
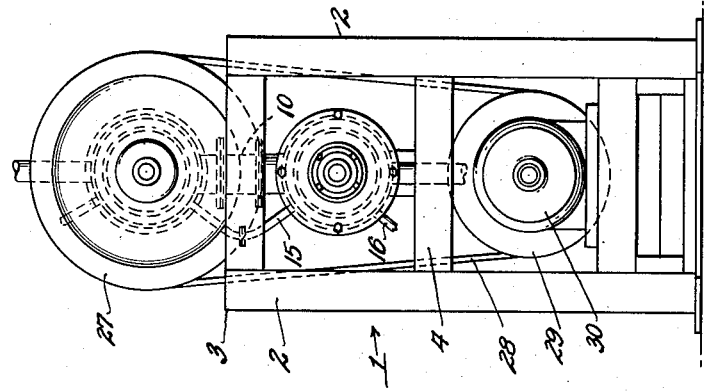
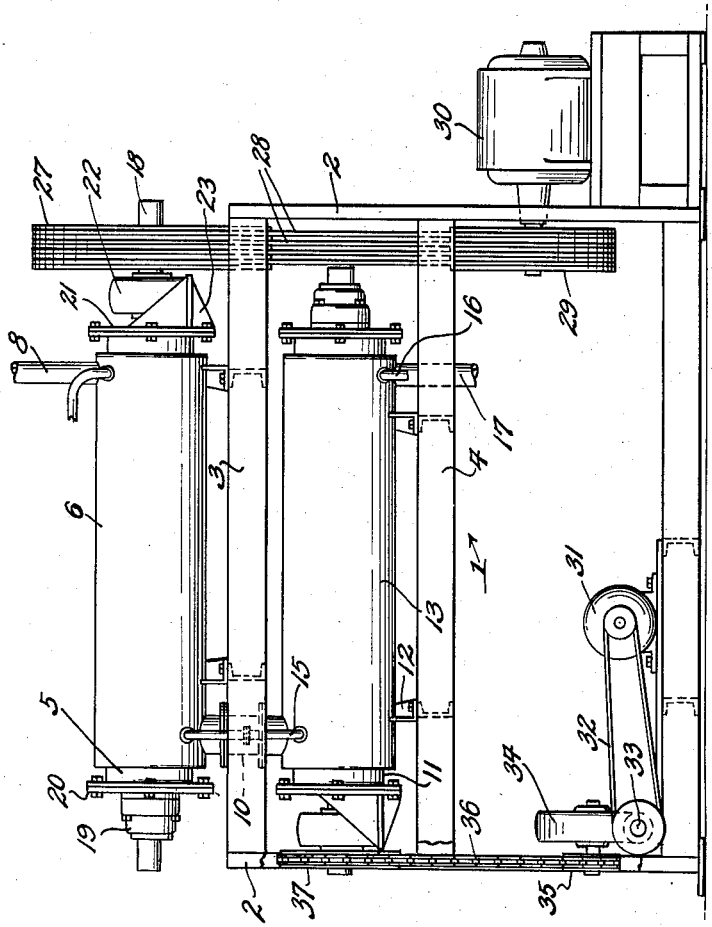
INVENTOR
John S. Truesdell
BY *W. S. McDowell*
ATTORNEY March 2, 1954
J. S. TRUESDELL
2,670,937
APPARATUS FOR PRODUCING FONDANT
MATERIAL FOR CANDY MANUFACTURE
Filed Jan. 24, 1951
2 Sheets-Sheet 2
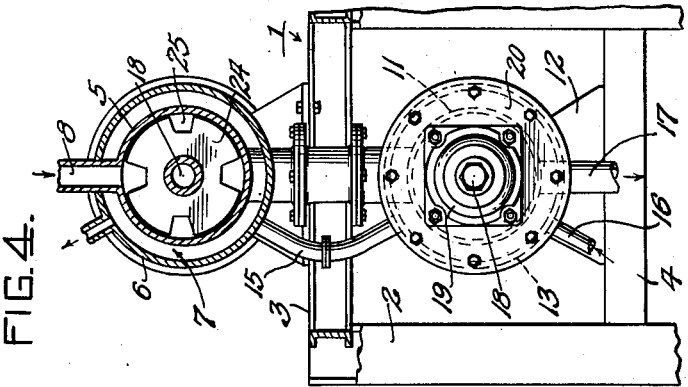
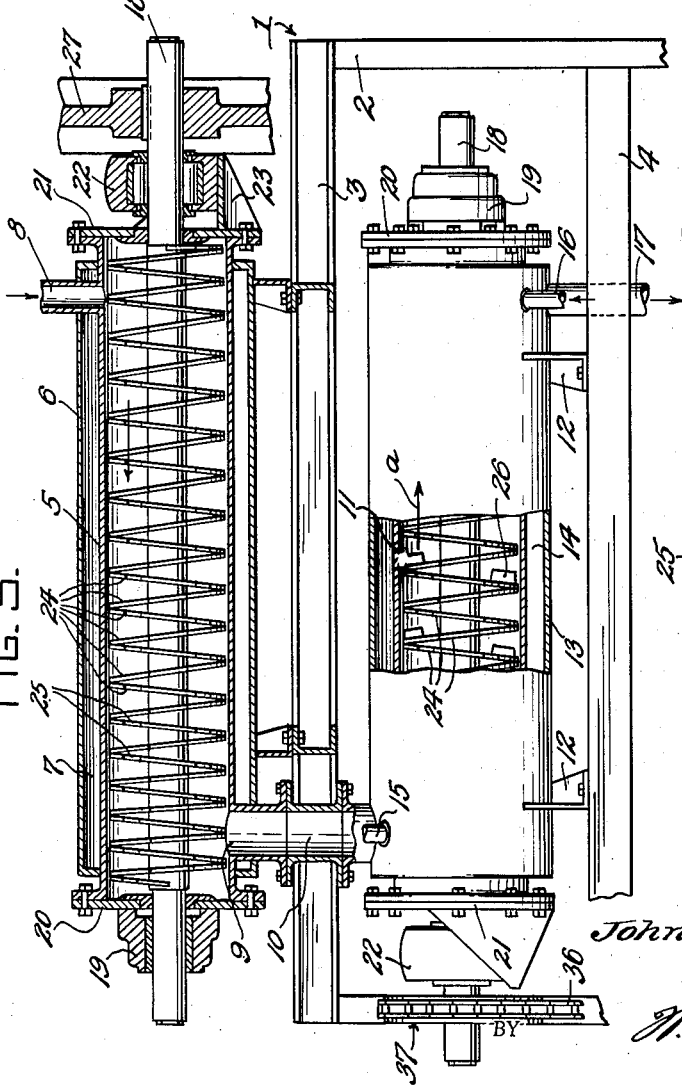
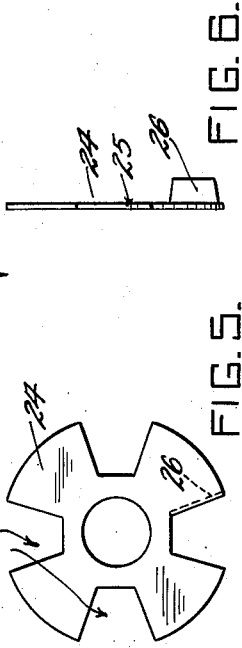
INVENTOR
John S. Truesdell
ATTORNEY

Patented Mar. 2, 1954

2,670,937

UNITED STATES PATENT OFFICE 2,670,937

APPARATUS FOR PRODUCING FONDANT MATERIAL FOR CANDY MANUFACTURE

John S. Truesdell, Los Angeles, Calif.

Application January 24, 1951, Serial No. 207,634

1 Claim. (Cl. 259—9)

This invention has reference to an improved apparatus for cooling, agitating and controlling the crystallization of heated syrups, such, for example, as those employed in candy manufacture.

Further, the present invention has reference to phase-changing means in which heated syrups, such as sucrose or other aqueous sugar-containing solutions, are subjected to conditions of controlled crystallization by being rapidly agitated while passing continuously through a temperature-reducing zone or means, whereby to transform the syrup into a plastic mass or solid highly suitable as an edible material in candy manufacture.

Very considerable use is now being made of a material known as cream fondant in the production of candy. Normally, this material comprises a combination of highly cooked cane and corn sugars, to which are added in limited degree certain fruit acids. The latter are employed to partially invert the sugar and to control its tendency to "grain off," that is, to form undesirably large crystals upon cooling. Large crystals are objectionable in fondant material since they are rough to the touch of the tongue, impart a sandy consistency or quality to the material and decrease its palatability. Therefore, in fondant manufacture, it is important to control carefully the cooling and crystallization of sugar solutions, whereby to form microscopic crystals which are not evident to the senses of touch and taste.

Customarily, the sugar solution from which cream fondant material employed in candy manufacture is made, is produced by thoroughly cooking the sugar-concentrated aqueous solutions, and followed by controlled cooling. Various methods and appliances are employed in effecting these operations, but the principle of batch operation, combined with slow cooling and agitation, is now being generally followed. In this regard, use is made of coil-type coolers in the cooling of heated syrup solutions. Again, the syrup is often poured on cold slabs or tables in a manner extracting heat therefrom. Other methods and appliances for cooling are also used, but they all have in common the control of grain or crystal size in the finished fondant material. As stated, the intermittent or batch system of operation is, so far as I am aware, generally used throughout the industry of candy manufacture. Also, in the industry after the cooling of the fondant material, the same is subjected to agitation of a slowly imparted relatively low degree. For example, such agitation has been accomplished with the use of a hand spade and while the fondant material is disposed on a cold table or slab. Again, dough-type mixers and ball beaters have been used in the slow agitation of the cold or cooling fondant material. While all these methods and appliances are employed in a manner to control crystallization of the cooling syrup and govern grain or crystal size, the processes are comparatively slow and are carried out on successive batches of material.

Also, following cooling of this fondant material and certain agitation thereof, it is customary to add to the material another sugar-containing body known as a "whip." This "whip" comprises generally a hot sugar solution combined with a whipping or frothing agent, which imparts to the finished product a marshmallow-like fluffy texture. The materials forming this "whip" are usually worked into the finished cream fondant after the latter has been formed, in order that a composite fondant may be produced of lighter and more palatable characteristics than a plain fondant would produce without the presence of the "whip" therein.

Therefore, in fondant manufacture there is involved the steps of, first, producing the basic fondant material by cooking the sugar-containing syrup-forming mixtures, second, cooling the heated syrup and agitating the same under conditions to control grain size thereof, and third, thereafter adding to the completed fondant a second body of material known as a "whip" to form a final composite fondant of desired taste and texture.

The present invention aims to improve these operations by providing, first, a means for forming fondant materials by a continuous sustained operation as contrasted with the intermittent or batch operations heretofore followed in fondant production; second, to provide a method and means for controlling the crystallization of syrup in which the syrup is subjected to rapid agitation with limited cooling during such agitation, whereby to facilitate the operation of obtaining uniformly the formation of desired minute crystals in the finished fondant, imparting a smooth texture and pleasing taste to the latter; and third, to utilize the rapid agitation imparted to the cooling syrup to permit the whip-forming materials to be introduced into the cooling syrup so that there takes place simultaneously the operations of controlling crystallization and intimately and uniformly mixing the whip-forming material with the fondant proper.

Further objects of the invention are: to provide readily controlled continuous flow apparatus in which is utilized a plurality of interconnected drums through which a heated syrup is passed in serial flow, the drums being formed with jackets for the passage of a fluid refrigerant which travels through the apparatus in countercurrent flow to the passage of the syrup, whereby to continuously cool and chill the syrup in effecting solidification and crystallization of the syrup as the same moves through the apparatus, changing its phase from that of a heated liquid to a solid, so that the resultant product will be adaptable for service as fondant material in candy manufacture; to provide apparatus of this nature in which the interior of the refrigerant-jacketed cylinders or drums, through which the fondant-forming syrup is advanced, are equipped with rotary material-conveying and agitating means, the latter serving simultaneously to beat and cause advancement of the fondant-forming material through the apparatus, to provide a method and apparatus of the character set forth through which the cooling and agitation of a sucrose solution, under controlled flow conditions, are obtained in a manner producing a desired rate of crystallization of the solution in forming quickly and conveniently a candy-making fondant, and to provide generally improved apparatus of this character for expediting, simplifying and providing economies in the art of manufacturing candy confections.

With these and other objects in view, which will appear as the description proceeds, the invention consists in the novel features of construction, combinations of elements, and arrangements of parts, hereinafter more fully described and pointed out with particularity in the following claim.

In the drawings:

Fig. 1 is a view in side elevation of the syrup-cooling, solidifying and mixing apparatus comprising the present invention;

Fig. 2 is a front elevational view thereof;

Fig. 3 is a vertical longitudinal sectional view, taken through the cooling, conveying and mixing cylinders of the apparatus forming the present invention;

Fig. 4 is a transverse vertical sectional view, partly in end elevation, of my improved apparatus;

Fig. 5 is a front elevational view of one of the mixing and conveying disks;

Fig. 6 is a front elevational view of the disk.

In the specific form of the invention illustrated in the accompanying drawings, apparatus useful in carrying out the present invention has been disclosed. This apparatus, however, is subject to certain mechanical variation or modification within the scope of the invention and should be considered as illustrative of but one of several possible embodiments. In the drawings, the numeral 1 designates a stationary frame structure, the latter including spaced vertical uprights 2 which, adjacent to the top thereof, are joined with horizontally disposed members, indicated at 3 and 4.

Supported on the frame members 3 is a primary horizontally positioned cylinder or drum 5, the latter being surrounded by an annular jacket 6, forming a space 7, between the outer walls of the cylinder and the inner walls of the jacket, for the passage or circulation of a fluid cooling medium or refrigerant. At one end, the cylinder or drum 5 is formed with a syrup inlet 8 by means of which a hot concentrated aqueous solution of sugar, produced by and obtained from other apparatus, not shown, is delivered to the interior of the cylinder or drum 5. This syrup or aqueous solution is passed longitudinally through the cylinder or drum 5 and is then discharged from the latter by way of an outlet connection 9, the latter being formed in the bottom thereof and at the opposite end of the drum with respect to the inlet 8.

The outlet 9 is joined with a continuing pipe connection 10 which constitutes a material inlet for a parallel secondary lower drum or cylinder 11, the latter being supported by brackets or their equivalents 12 on the horizontal frame members 4, the drum 11 being arranged immediately below the upper cylinder or drum 5. Also, surrounding the lower drum or cylinder 5 is a jacket 13 which forms a brine or refrigerant-circulating space 14, the latter communicating with the space 7 of of the upper cylinder by means of conduit connections shown at 15. The refrigerant may enter the apparatus through the inlet 16, which adjoins the jacket 13 adjacent to the outlet 17 for the discharge of the cool crystallized fondant mass of candy-forming material.

Passing axially through each of the drums or cylinders 5 and 11 is a longitudinally extending shaft 18. One end of each of these shafts is journaled in a bearing 19 carried by a removable end plate 20 of each cylinder. The opposite end of each shaft extends through a packed opening provided in an opposite end plate 21 of each cylinder and is journaled for rotation in an anti-friction bearing 22 which is carried by and supported on a shelf 23 projecting from each end plate 21.

Secured to each of the shafts 18 and arranged for rotation in the drums or cylinders 5 and 11 are agitating and conveying disks 24. Each of these disks possesses a diameter approximating that of the drums or cylinders, and peripherally each disk is formed, as shown in Fig. 5, with a plurality of inwardly directed recesses 25. The disks are permanently arranged on their shafts in pairs, with the disks of each pair disposed in angularly intersecting planes, the disks being retained in such relative order by welding or otherwise stationarily securing the same to the shafts 18. If desired, certain of the disks may, as shown in Fig. 6, be formed with angularly turned flanges 26, which operate as agitators or beaters, when the shafts 18 are rotated, for the purpose of blending the compounds undergoing treatment in the apparatus and producing uniform temperatures throughout the mass thereof.

To drive the shafts 18, the upper shaft has fixed thereto at one end of a belt wheel 27, around which passes a plurality of endless V-type belts 28, the latter being also trained around a belt wheel 29, which is carried by the armature shaft of an electric motor 30, the latter being arranged at the bottom of the frame structure 1 and at one side thereof. A separate drive is used for the lower or bottom shaft. In the form of the apparatus illustrated, this drive comprises an electric motor 31, the shaft of which carries a belt wheel having trained thereabout an endless belt 32, the latter leading to the belt wheel provided on the worm-carrying shaft 33 of a speed reducer 34. This speed reducer is provided with a sprocket 35 around which passes an endless chain 36, the latter leading to a sprocket 37 fixed on one end of the lower of the shafts 18, whereby when the motor 31 is operated, positive forces will be applied to said lower shaft to effect the rotation of the disks 24 therein against the resistance offered by the substantially solidified fondant material.

In the operation of the apparatus, a heated syrup, comprising an aqueous solution of sugar and obtained from a heating kettle or other similar means, not shown, is introduced into the upper or fondant cooling drum or cylinder 5 by way of its inlet 8. When the syrup enters the top drum the same possesses normally temperatures varying between 230° F. and 260° F., and is cooled in that drum while it is being rapidly agitated. The syrup is churned or agitated by the action of the disks 24 mounted on the shaft 18, bringing the hot syrup into contact with the cooled outer walls of the drum 5, the said walls being cooled by the passage of a fluid refrigerant or the like through the space 7. The change of the sugar solution from liquid to solid actually creates its own heat, and causes the discharge end 9 of the drum to stay at a minimum temperature of approximately 180° F. In other words, there is some rapid cooling of the syrup in the forward part of the top drum from, for example, 240° F. down to a possible 200° F. when the material attains the middle portion of the drum in its advancement through the latter. By that time, the crystallization and the high power necessary to rapidly agitate the steadily solidifying mass, heats the latter to a minimum of 180° to 190° F. as the material flows from the top drum into the second drum. Also, with the main fondant-forming material, there may be simultaneously introduced into the upper drum through its inlet 8 a desired quantity of the secondary or "whip" material, the latter also being in the form of a hot solution. Due to the relatively rapid rotation of the agitator in the upper drum, formed by the shaft 18 and its disks 24, the "whip" material is uniformly distributed throughout the mass of the main fondant material, whereby to cause the final end product to possess the desired light consistency.

In a practical example of the apparatus, forming the present invention, which I have developed, a 30 H. P. electric motor is employed to drive the agitating means provided in the upper drum or cylinder, the agitating means rotating at a speed of approximately 600 R. P. M. On the other hand the motor employed for driving the agitating and material-advancing means of the lower drum or cylinder 13 may be of the order of 5 H. P., turning the agitating means in the lower cylinder at approximately 10 R. P. M. Of course, the lower drum takes its power from the motor 31 and the gear reducer 34, thereby gaining tremendously in torque effort as it diminishes in R. P. M.

The action of the two cylinders is quite simple. The first or primary cylinder or drum 6 receives the hot sucrose solution so that by the rapid agitation imparted to the solution by the agitating means in the upper or primary drum, and also through controlled temperature reduction, a condition of regulated crystallization is set up, which changes the hot sucrose solution into a true candymaker's fondant. The purpose of the bottom or secondary drum is merely to mix and further cool the material or materials made in the top drum. Otherwise stated, the top drum makes the candy, while the bottom drum prepares it for forming into pieces of desired size. Controlled crystallization of a hot sucrose solution is obtained in the top drum. Were the agitation slower in this top drum the crystal formation would be too large and not desirable. Were the cooling less, certain other undesirable factors in the taste or texture of the completed product presented, or if the cooling were greater the flow of material through the drums might readily be obstructed.

In the top drum two operations are performed simultaneously. First, making the primary fondant and, second, adding the so-called "whip." All this takes place while the material is undergoing continuous movement through the apparatus, avoiding altogether intermittent or batch operations.

It will be noted that the flow of the syrup and fondant-forming materials through the apparatus is in countercurrent relationship with the flow of the refrigerant through the cooling jackets. Such countercurrent flow provides for the desired rate of cooling of the syrup and its change in phase from that of a relatively thick viscid fluid into that of a solid. The solidified materials discharged from the apparatus may be cut or formed into desired particle sizes, covered with chocolate or other coatings, and otherwise utilized readily in candy manufacture. The apparatus avoids handling the fondant by operators in candy manufacturing establishments, and provides generally speed, thoroughness and economy in the production of an important body-forming material which is so largely employed in various types of candies.

I claim:

In apparatus for cooling, agitating and conveying heated materials, a frame; a horizontally extending drum having end walls; means stationarily supporting said drum in connection with said frame; a jacket-forming casing surrounding said drum, said casing providing a chamber for the passage of fluid refrigerant; a shaft extending longitudinally and axially through said drum, said shaft being journaled for rotation in the end walls of said drum; conveyor and agitator means mounted on said shaft, said last-named means being disposed within said drum in positions to advance heated materials from a receiving end of said drum to an opposite discharge end thereof and, during such advance, to agitate and mix said materials while the same are being cooled by said refrigerant, said agitating and conveying means including a plurality of disks fixed in closely adjoining order to said shaft, alternate disks being disposed in parallel order and in acute angular relationship to a plane perpendicular to the longitudinal axis of the shaft, said disks having recessed passages in their circumferential edges, the circumferential edges of adjoining disks being disposed in closely adjacent order and in contacting engagement with the inner wall surfaces of said drum, the material in traversing said drum passing through the recessed passages of said disks.

JOHN S. TRUESDELL.

References Cited in the file of this patent

UNITED STATES PATENTS

| Number | Name | Date |
| --- | --- | --- |
| 521,194 | Van Court | June 12, 1894 |
| 1,575,584 | Kermer | Mar. 2, 1926 |
| 1,630,071 | Offenhauser | May 24, 1927 |
| 2,032,201 | Davis et al. | Feb. 25, 1936 |
| 2,146,178 | Farley | Feb. 7, 1939 |
| 2,169,338 | Ditto | Aug. 15, 1939 |
| 2,199,887 | Lund | May 7, 1940 |
| 2,243,317 | Phelan | May 27, 1941 |
| 2,455,945 | North et al. | Dec. 14, 1948 |

FOREIGN PATENTS

| Number | Country | Date |
| --- | --- | --- |
| 111,518 | Switzerland | Dec. 17, 1923 |